United States Patent Office 3,595,856
Patented July 27, 1971

3,595,856
17β-HYDROXY-20,21-PREGNANEDICARBOXYLIC ACID γ-LACTONES AND DERIVATIVES
Yvon Lefebvre, Pierrefonds, Quebec, Canada, assignor to American Home Products Corporation, New York, N.Y.
No Drawing. Filed Apr. 4, 1969, Ser. No. 813,711
Int. Cl. C07c 173/00
U.S. Cl. 260—239.55                22 Claims

ABSTRACT OF THE DISCLOSURE

There are disclosed herein derivatives of 17β-hydroxy-pregnane-20,21-dicarboxylic acid γ-lactone of the Formula I:

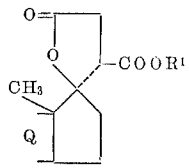

in which $R^1$ represents a hydrogen atom, a methyl or an ethyl group and Q represents the A, B and C rings of a steroid nucleus of the 19-norpregnane or pregnane series together with the substituents attached thereto. The compounds are prepared by treating the corresponding 17α-[3'-furyl]-17β-hydroxysteroids with an organic peracid in the presence of a nucleophilic reagent, to obtain the corresponding 4,4-dihydroxy-2-butenoic acid lactones attached in position 3 to the 17β-position of the respective steroid; treating said last-named compounds with chromic acid to obtain the correspondingly substituted maleic anhydride derivatives; treating said last-named compounds with zinc and acetic acid to obtain the correspondingly substituted succinic anhydride derivatives; dissolving said last-named compounds in aqueous alkali and treating the solution with excess aqueous acid to obtain the corresponding compounds of Formula I, in which $R^1$ represents hydrogen; treatment of the latter compounds with diazomethane or diazoethane yields the corresponding methyl or ethyl esters. The compounds are useful as antigonadotrophic agents substantially free from estrogenic effects.

BACKGROUND OF THE INVENTION

This invention relates to a new and interesting class of steroid lactones which are derivatives of 17β-hydroxy-pregnane-20,21-dicarboxylic acid γ-lactone, to intermediates used in their preparations and to a process for preparing these lactones.

The lactones of this invention possess antigonadotrophic activity at doses which are substantially free of estrogenic activity. This feature makes these compounds particularly attractive since agents which can suppress gonadotrophic activity without eliciting estrogenic effects are desired for the treatment of menopausal symptoms in cases where estrogen therapy is contraindicated, such as in women with a previous history of fibroids of the uterus.

SUMMARY OF THE INVENTION

The steroid lactones of this invention are represented by Formula I,

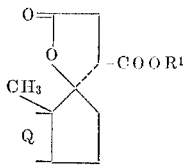

in which $R^1$ represents a hydrogen atom, a methyl or an ethyl group and Q represents the A, B and C rings of a steroid nucleus of the 19-norpregnane or pregnane series together with the substituents attached thereto.

More particularly, the preferred embodiment of this invention relates to compounds of Formula I in which Q represents the A, B and C rings of the 3-substituted 19-norpregnane nucleus. Such compounds are represented by Formulae II, III and IV

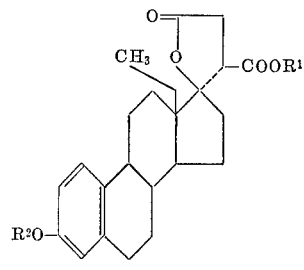

II

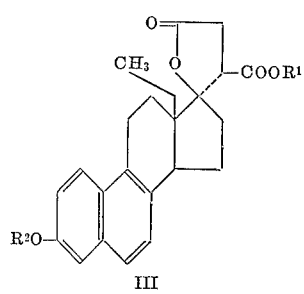

III

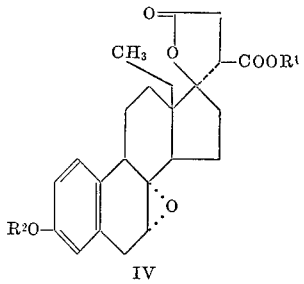

IV in which $R^2$ represents a hydrogen atom, an alkyl group containing from one to four carbon atoms, a cycloalkyl group containing from five to six carbon atoms or an acyl group containing from two to four carbon atoms.

DETAILED DESCRIPTION OF THE INVENTION

The steroid lactones of this invention of general Formulae II, III and IV possess antigonadotrophic activity. More particularly, these steroid lactones exhibit potent oral and parenteral activity when tested in standard pharmacologic tests for antigonadotrophic activity, such as, for example the test described by C. Revesz and C. I. Chappel, J. Reprod. Fert., vol. 12, p. 473 (1966). On the other hand, the substantial absence of estrogenic effects at doses used to elicit antigonadotrophic effects may be readily demonstrated in standard laboratory tests for estrogenic activity, for example, the uterotrophic assay described by B. L. Rubins et al., Endrocrinol., vol. 49, p. 429 (1951).

When the compounds of this invention are employed as antigonadotrophic agents in warm-blooded animals, e.g. rats, alone or in combination with pharmacologically acceptable carriers, the proportion of which is determined by the solubility and chemical nature of the compound, chosen route of administration and standard biological practice. For example, they may be administered orally in solid form containing such excipients as starch, milk, sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in a range of from about 0.01 mg. to about 2.0 mg. per kilo per day, although as aforementioned variations will occur. However, a dosage level that is in the range of from about 0.1 mg. to about 1 mg. per kilo per day is most satisfactory. Such doses may be administered once or twice a day as required.

The preferred processes for preparing the steroid lactones of general Formulae II, III and IV may be schematically represented by formulae $$V \rightarrow VI \rightarrow VII \rightarrow VIII \rightarrow I$$

in which Q represents rings A, B and C of the steroid lactones II to IV as defined above and $R^1$ is as defined above.

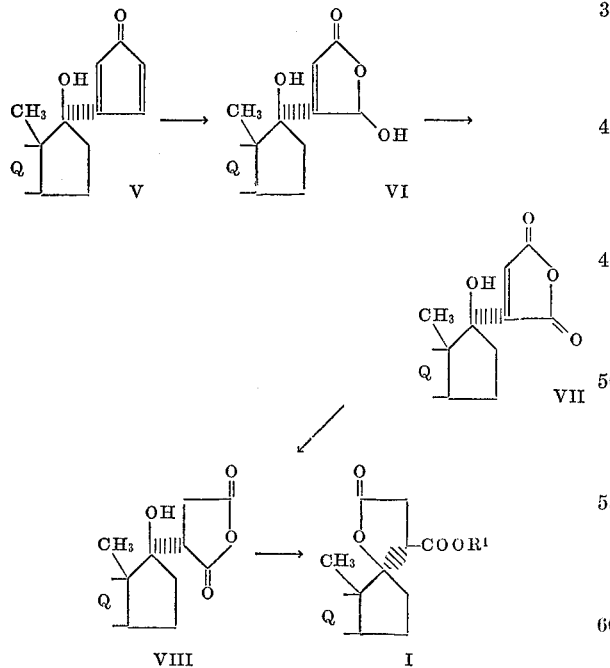

The 17α-[3'-furyl]-17β-hydroxy steroids represented by general Formula V in which Q represents rings A, B and C of the steroid lactones II and III as defined above are the preferred starting materials for the preparation of the steroid lactones of this invention of general Formulae II and III, respectively. These starting materials are described in U.S. Pat. No. 3,271,392.

The 17α-[3'-furyl]-17β - hydroxy steroids represented by general Formula V in which Q represents rings A, B, and C of the steroid lactone IV as defined above are the preferred starting materials for the preparation of the steroid lactones of this invention of general Formula IV defined above. These starting materials are prepared by treating the appropriate 3-alkyl or 3-cycloalkyl ethers of equilin, or the 3-tetrahydropyranyl ether of equilin with a peracid, preferably, m-chloroperbenzoic acid, described by L. F. Fieser and M. Fieser, "Reagents for Organic Synthesis," John Wiley and Sons, New York, 1967, p. 135, in an inert solvent, preferably chloroform, isolating the product—the corresponding 7α,8-epoxy derivative and treating said product with 3-furyllithium in a mixture of ether-toluene at room temperature in the manner described in U.S. Pat. No. 3,271,392. In this manner, the corresponding 3-alkyl and 3-cycloalkyl ethers of general Formula V, the desired starting materials of Formula V in which Q represents rings A, B, and C of the steroid lactone IV in which $R^2$ represents an alkyl or a cycloalkyl group are obtained, as well as the corresponding 3-tetrahydropyranyl ether of 7α,8-epoxy-17α-[3-furyl]-estra - 1,3,5(10) - triene - 3,17-diol. The latter compound is hydrolyzed under mildly acidic conditions, for example, dilute hydrochloric acid in methanol, to yield the corresponding free 3-hydroxy derivative of Formula V in which Q represents rings A, B, and C of the steroid lactone IV in which $R^2$ represents hydrogen, which together with its corresponding 3-acyl derivatives are the remaining preferred starting materials of Formula V. Said 3-acyl derivatives are readily prepared by treating the above 3-hydroxy derivative of Formula V with an appropriate acid anhydride or acid halide in pyridine at room temperature.

In the preceding process for the preparation of said starting materials of general Formula V in which Q represents rings A, B, and C of steroid lactone IV and $R^2$ represents a hydrogen atom or an acyl group, the tetrahydropyranyl ether of equilin is preferably used rather than equilin. This preference is based on my observation that, within equilin is used in this process, the consequential presence of the free 3-hydroxy group during the treatment with the reagent, 3-furyllithium, allows a complex to be formed between the reagent and the hydroxy group causing a waste of the reagent and adversely affecting the yield of the process.

The 3 - alkyl and 3 - cycloalkyl ethers of equilin, used for the preparation of the above starting materials, are prepared from equilin according to the methods described by F. Glockling and D. Kingston, Chemistry and Industry, 1037 (1961) and the 3-tetrahydropyranyl ether of equilin is prepared according to the method of A. D. Cross et al., Steroids, vol. 4, p. 423 (1964). Equilin is a well-known naturally occurring steroid, see L. F. Fieser and M. Fieser, "Steroids," Reinhold Publishing Corportion, New York, 1959. 3-furyllithium is prepared according to the method of S. Gronowitz and G. Sorlin, Arkiv for Kemi, vol. 19, p. 515 (1962), by the action of butyllithium upon 3-iodofuran, in ether at −60° C. In turn, 3-iodofuran is obtained from furoic acid according to the method of G. Wright and H. Gilman, J. Am. Chem. Soc. vol. 55, p. 3302 (1933).

The above starting materials of Formula V are converted to the intermediates of Formula VI, in which Q represents rings A, B, and C of the steroid lactones II, III, and IV in which $R^2$ represents a hydrogen atom or an alkyl, cycloalkyl or acyl group defined as above by treatment with an organic peracid in the presence of a nucleophilic reagent such as acetic acid or water. Preferably, a buffer, such as sodium acetate, is employed during the course of the reaction and approximately the same molar amounts of nucleophilic reagent and steroid starting material are employed. Among the organic peracids capable of being employed in this process, I have obtained very good results with m-chloroperbenzoic acid used in a two to ten fold excess. Any practical solvent inert to the reaction conditions may be employed; chloroform is quite suitable for this purpose. Preferred ranges for reaction time and temperature are from one half to twenty-four hours and 20–30° C., respectively.

The intermediates of Formula VI are readily oxidized by means of hexavalent chromium ion to the corresponding maleic anhydride derivatives of Formula VII in which Q represents the A, B and C rings of steroid lactones II, III and IV in which $R^2$ represents a hydrogen atom or an alkyl, cycloalkyl or acyl group as defined above. Chromic acid in the presence of sulfuric acid and water, a modification described by A. Bowers et al., J. Chem. Soc., p. 2548 (1953), is a preferred reagent for this oxidation.

The above maleic anhydride derivatives of Formula VII are noteworthy on two accounts. Not only are they useful intermediates for the preparation of the steroid lactones of this invention but they also possess the pharmacological properties of said lactones showing a profound antigonadotrophic inhibition at doses which do not stimulate the uterus in the pharmacologic tests described above. These maleic anhydride derivatives may be employed as antigonadotrophic agents in the same manner as described for the steroid lactones of this invention.

The maleic anhydride derivatives of Formula VII, including their corresponding 3-acylates, described above, may be reduced in the presence of zinc and acetic acid to yield the corresponding succinic anhydride derivatives of Formula VIII in which Q represents the A, B and C rings of the steroid lactones II, III and IV in which $R^2$ represents a hydrogen atom or an alkyl, cycloalkyl or acyloxy group as defined above.

These succinic anhydride derivatives of Formula VIII may be isolated and purified; however, I have found it convenient to convert them directly to the steroid lactones of this invention in the following manner: Following the isolation of the crude succinic anhydride derivatives from the above reduction mixture, the derivatives are dissolved in an aqueous solution of an alkali metal hydroxide, for example, a 0.1 N solution of sodium hydroxide. Subsequent acidification of the aqueous alkaline solution readily affords the corresponding steroid lactones of this invention of Formulae II, III and IV in which $R^1$ is a hydrogen atom and $R^2$ is a hydrogen atom, an alkyl or a cycloalkyl group as defined above.

During the conversion of the succinic acid derivatives to the steroid lactones of this invention in the above manner, it should be noted that an acyl group present at the 3-position of the steroid nucleus will be hydrolyzed. On the other hand, the steroid lactones of this invention of Formulae II, III and IV in which $R^1$ is a hydrogen atom and $R^2$ is an acyl group as defined above, are conveniently prepared by treating the corresponding steroid lactones of Formulae II, III and IV in which $R^2$ is a hydrogen atom, prepared as described above, with the appropriate aliphatic acid anhydride or acyl halide in the presence of pyridine.

Finally, the steroid lactones of this invention of Formulae II, III and IV in which $R^1$ is a methyl or ethyl group are conveniently prepared from the corresponding steroid lactones of Formulae II, III or IV in which $R^1$ is hydrogen by conventional esterification methods such as those described by L. F. Fieser and M. Fieser, "Advanced Organic Chemistry," Reinhold Publishing Corporation, New York, 1961, pp. 370–381.

The following examples will illustrate this invention.

EXAMPLE 1

The higher ether homologues of equilin are prepared by the method of F. Glockling and D. Kingston, described in Chem. and Ind., 1037 (1961), by the action of the corresponding alkyl halides on the sodium or potassium salts of the phenols. Accordingly, equilin 3-methyl ether, equilin 3-ethyl ether, equilin 3-propyl ether, equilin 3-isopropyl ether, equilin 3-n-butyl ether, equilin 3-sec.-butyl ether, equilin 3-cyclopentyl ether, and equilin 3-cyclohexyl ether are obtained. The corresponding tetrahydropyranyl ether is prepared according to the method described by A. D. Cross et al. in Steroids, vol. 4, p. 423 (1964).

EXAMPLE 2 m-Chloroperbenzoic acid (4.05 g.) is added by portions, over a period of 30 minutes, to a stirred, ice-cold solution of equilin 3-methyl ether (5 g.). The mixture is stirred for an additional 2-hours in the ice-bath and then for 30 minutes at room temperature. The solution is washed with a 5% sodium carbonate solution and with water, dried and evaporated. The colour is removed from the crude crystalline product by filtration through a column of alumina. The fractions eluted with 1:1-benzene-petroleum ether are combined and crystallized from methanol to yield 7α,8 - epoxy-3-methoxyestra-1,3,5(10)-trien-17-one, M.P. 176–178° C.

In the same manner, the other ethers of equilin, obtained in Example 1 are oxidized to the corresponding 7α,8-epoxy derivatives, when treated with m-chloroperbenzoic acid in chloroform solution. In this manner there are obtained:

7α,8-epoxy-3-ethoxyestra-1,3,5(10)-trien-17-one,
7α,8-epoxy-3-propoxyestra-1,3,5(10)-trien-17-one,
7α,8-epoxy-3-isopropoxyestra-1,3,5(10)-trien-17-one,
3-n-butoxy-7α,8-epoxyestra-1,3,5(10)-trien-17-one,
3-sec-butoxy-7α,8-epoxyestra-1,3,5(10)-trien-17-one,
3-cyclopentyloxy-7α,8-epoxyestra-1,3,5(10)-trien-17-one,
3-cyclohexyloxy-7α,8-epoxyestra-1,3,5(10)-trien-17-one and
7α,8-epoxy-3-tetrahydropyranyloxyestra-1,3,5(10)-trien-17-one.

EXAMPLE 3

A solution of 3-iodofuran (5 g.), ether (100 ml.), and a 1.47 N ethereal solution of n-butyllithium (13.6 ml.), is stirred at −60° C. for 30 minutes. A solution of 7α,8-epoxy-3-methoxyestra-1,3,5(10)-trien-17-one (5 g.), obtained in Example 2, in toluene (200 ml.), is then added and the mixture is stirred at room temperature for 16 hours. Ether and water are added. The organic phase is separated and further washed with water. After drying and evaporating the solvents, the solid residue is crystallized several times with methylene chloride-ether to give the 3-alkyl ether, 7α,8-epoxy-17α-[3′-furyl]-3-methoxyestra-1,3,5(10)-trien-17-ol, M.P. 223–225° C.

In the same manner, the other 3-alkyl ethers of 7α,8-epoxy-3-hydroxyestra-1,3,5(10)-trien-17-one, prepared as described in Example 2, are treated with 3-furyllithium to yield the corresponding 17α-[3′-furyl]-17β-hydroxy derivatives such as:

7α,8-epoxy-3-ethoxy-17α-[3′-furyl]estra-1,3,5(10)-trien-17-ol,
7α,8-epoxy-17α-[3′-furyl]-3-propoxyestra-1,3,5(10)-trien-17-ol,
7α,8-epoxy-17α-[3′-furyl]-3-isopropoxyestra-1,3,5(10)-trien-17-ol,
3-n-butoxy-7α,8-epoxy-17α-[3′-furyl]estra-1,3,5(10)-trien-17-ol,
3-sec.-butoxy-7α,8-epoxy-17α[3′-furyl]estra-1,3,5(10)-trien-17-ol,
3-cyclopentyloxy-7α,8-epoxy-17α-[3′-furyl]estra-1,3,5(10)-trien-17-ol,
3-cyclohexyloxy-7α,8-epoxy-17α-[3′-furyl]estra-1,3,5(10)-trien-17-ol and,
7α,8-epoxy-17α-[3′-furyl]-3-tetrahydropyranyloxyestra-1,3,5(10)-trien-17-ol.

EXAMPLE 4

A solution of 7α,8-epoxy-17α-[3′-furyl]-3-tetrahydropyranyloxyestra-1,3,5(10)-trien-17-ol (31.1 g.), obtained as described in Example 3, in methanol (1244 ml.) is stirred for one hour at room temperature with a 0.1 N solution of hydrochloric acid (311 ml.). Water (1800 ml.) is added and the resulting solid is filtered, washed well with water and dried. Several crystallizations of this solid from nitromethane yields 7α,8 - epoxy-17α-[3′-furyl]-estra-1,3,5(10)-triene-3,17-diol, M.P. 154–156° C.

EXAMPLE 5

A solution of 7α,8-epoxy-17α-[3-furyl]estra-1,3,5(10)-triene-3,17-diol, (5 g.), obtained in Example 4, in pyridine (50 ml.), and acetic anhydride (50 ml.), is stirred at room temperature for 2½ hours. The solution is diluted with ice-water and is extracted with ether. The ether is washed with dilute sulfuric acid, water, sodium bicarbonate, and water, again to neutrality. The solution is dried and evaporated to yield 3-acetoxy-7α,8-epoxy-17α-[3'-furyl]-estra-1,3,5(10)-trien-17-ol as an amorphous solid, $\gamma_{max.}^{CHCl_3}$ 1750 cm.$^{-1}$ (acetate) and 875 cm.$^{-1}$ (furan group)

In the same manner, but using an equivalent amount of propionic or butyric anhydride instead of acetic anhydride, 7α,8-epoxy-17α-[3'-furyl] - 3 - propionyloxyestra - 1,3,5-(10)-trien-17-ol and 3 - butanoyloxy-7α,8-epoxy-17α-[3'-furyl]-estra-1,3,5(10)-trien-17-ol, are obtained, respectively.

EXAMPLE 6

(A) A mixture of the 17α - [3'-furyl]-17β-hydroxy steroid, 17α - [3'-furyl]-3-methoxyestra-1,3,5(10)-trien-17-ol (17 g.), described in U.S. Pat. No. 3,271,392, chloroform (850 ml.), sodium acetate (17 g.), acetic acid (17 ml.) and m-chloroperbenzoic acid (85%) (23.65 g.) is stirred at room temperature for 1 hour. Ether is added. The organic solution is washed with sodium bicarbonate and water, dried and evaporated. The residue is chromatographed on silica gel. The fractions eluted with 2% benzene in methanol are combined and crystallized with acetone-hexane to give the intermediate of Formula VI, 4,4 - dihydroxy-3-[17'β-hydroxy-3'-methoxyestra-1',3',5'(10')-trien-17'-yl]-2-butenoic acid lactone, M.P. 214–216° C. $[\alpha]_D^{CHCl_3}=+81.9°$.

In the same manner, the appropriate 17α-[3'-furyl]-17β-hydroxy steroids, described in U.S. Pat. No. 3,271,392, are oxidized to the corresponding intermediates of Formula VI, when treated with m-chloroperbenzoic acid. In this manner, there are obtained the corresponding intermediates of Formula VI:

4,4-dihydroxy-3-[3',17'β-dihydroxyestra-1',3',5'(10')-trien-17'-yl]-2-butenoic acid lactone, 3-[3'-ethoxy-17'β-hydroxyestra-1',3',5'(10')-trien-17'-yl]-4,4-dihydroxy-2-butenoic acid lactone, 4,4-dihydroxy-3-[17'β-hydroxy-3'-propoxyestra-1',3',5'(10')-trien-17'-yl]-2-butenoic acid lactone, 4,4-dihydroxy-3-[17'β-hydroxy-3'-isopropoxyestra-1',3',5'(10')-trien-17'-yl]-2-butenoic acid lactone, 3-[3'-n-butoxy-17'β-hydroxyestra-1',3',5'(10')-trien-17'-yl]-4,4-dihydroxy-2-butenoic acid lactone, 3-[3'-sec.-butoxy-17'β-hydroxyestra-1',3',5'(10')-trien-17'-yl]-4,4-dihydroxy-2-butenoic acid lactone, 3-[3'-cyclopentyloxy-17'β-hydroxyestra-1',3',5'(10')-trien-17'-yl]-4,4-dihydroxy-2-butenoic acid lactone, M.P. 194.5–196°, $[\alpha]_D^{CHCl_3}=+46.9°$, 3-[3'-cyclohexyloxy-17'β-hydroxyestra-1',3',5'(10')-trien-17'-yl]-4,4-dihydroxy-2-butenoic acid lactone, 3-[3'-acetoxy-17'β-hydroxyestra-1',3',5'(10)-trien-17'-yl]-4,4-dihydroxy-2-butenoic acid lactone, M.P. 230–233° $[\alpha]_D^{CHCl_3}=+117°$, 4,4-dihydroxy-3-[17'β-hydroxy-3'-propionyloxyestra-1',3',5'(10')-trien-17'-yl]-2-butenoic acid lactone, 3-[3'-n-butanoyloxy-17'β-hydroxyestra-1',3',5'(10')-trien-17'-yl]-4,4-dihydroxy-2-butenoic acid lactone, 4,4-dihydroxy-3-[3',17'β-dihydroxyestra-1',3',5'(10')-6',8'-pentaen-17'-yl]-2-butenoic acid lactone, 4,4-dihydroxy-3-[17'β-hydroxy-3'-methoxyestra-1',3',5'(10'),6',8'-pentaen-17'-yl]-2-butenoic acid lactone, 3-[3'-ethoxy-17'β-hydroxyestra-1',3',5'(10'),6',8'-pentaen-17'-yl]-4,4-dihydroxy-2-butenoic acid lactone, 4,4-dihydroxy-3-[17'β-hydroxy-3'-propoxyestra-1',3',5'(10'),6',8'-pentaen-17'-yl]-2-butenoic acid lactone, 4,4-dihydroxy-3-[17'β-hydroxy-3'-isopropoxyestra-1',3',5'(10'),6,8-pentaen-17'-yl]-2-butenoic acid lactone, 3-[3'-n-butoxy-17'β-hydroxyestra-1',3',5'(10'),6',8'-pentaen-17'-yl]-4,4-dihydroxy-2-butenoic acid lactone, 3-[3'-sec.-butoxy-17'β-hydroxyestra-1',3',5'(10'),6',8'-pentaen-17'-yl]-4,4-dihydroxy-2-butenoic acid lactone, 3-[3'-cyclopentyloxy-17'β-hydroxyestra-1',3',5'(10'),-6',8'-pentaen-17'-yl]-4,4-dihydroxy-2-butenoic acid lactone, 3-[3'-cyclohexyloxy-17'β-hydroxyestra-1',3',5'(10'),6',8'-pentaen-17'-yl]-4,4-dihydroxy-2-butenoic acid lactone, 3-[3'-acetoxy-17'β-hydroxyestra-1',3',5'(10'),6',8'-pentaen-17'-yl]-4,4-dihydroxy-2-butenoic acid lactone, 4,4-dihydroxy-3-[17'β-3'-propionyloxyestra-1',3',5'-(10'),6',8'-pentaen-17'-yl]-2-butenoic acid lactone, and 3-[3'-n-butanoyloxy-17'β-hydroxyestra-1',3',5'(10'),6',-8'-pentaen-17'-yl]-4,4-dihydroxy-2-butenoic acid lactone.

(B) A solution of m-chloroperbenzoic acid (70%—7.7 g.) in chloroform (100 ml.) is added to a mixture of 7α,8 - epoxy - 17α-[3'-furyl]-3-methoxyestra-1,3,5(10)-trien-17-ol (5.0 g.), prepared as described in Example 3, chloroform (100 ml.), sodium acetate (5.0 g.) and acetic acid (5.0 ml.). The reaction mixture is stirred for 50 minutes. Ether is added and the organic solution is washed with sodium bicarbonate and water, dried, and evaporated. The residue is suspended in ether and the insoluble material collected affording 3-[7'α,8-epoxy-17'β-hydroxy - 3'-methoxyestra-1',3',5'(10')-trien-17'-yl]-4,4-dihydroxy-2-butenoic acid lactone, M.P. 235–236° C., $[\alpha]_D^{CH_3OH}=+105.1°$.

In the same manner, 7α,8-epoxy-17α-[3'-furyl]estra-1,3,5(10)-triene-3,17-diol, prepared as described in Example 4, the appropriate 3-alkyl and 3-cycloalkyl ethers, prepared as described in Example 3, and the appropriate 3-acyl derivatives, prepared as described in Example 5, are oxidized with m-chloroperbenzoic acid. In this manner, there are obtained the corresponding intermediates of Formula VI:

3-[7'α,8'-epoxy-3',17'β-dihydroxyestra-1',3',5'(10')-trien-17'-yl]-4,4-dihydroxy-2-butenoic acid lactone, 3-[7'α,8'-epoxy-3'-ethoxy-17'β-hydroxyestra-1',3',5'(10')-trien-17'-yl]-4,4-dihydroxy-2-butenoic acid lactone, 3-[7'α,8'-epoxy-17'β-hydroxy-3'-propoxyestra-1',3',5'-(10')-trien-17'-yl]-4,4-dihydroxy-2-butenoic acid lactone, 3-[7'α,8'-epoxy-17'β-hydroxy-3'-isopropoxyestra-1',3',5'-(10')-trien-17'-yl]-4,4-dihydroxy-2-butenoic acid lactone, 3-[3'-n-butoxy-7'α,8'-epoxy-17'β-hydroxyestra-1',3',5'(10')-17'-yl]-4,4-dihydroxy-2-butenoic acid lactone, 3-[3'-sec.-butoxy-7'α,8'-epoxy-17'β-hydroxyestra-1',3',5'(10')-trien-17'-yl]-4,4-dihydroxy-2-butenoic acid lactone, 3-[3'-cyclopentyloxy-7'α,8'-epoxy-17'β-hydroxyestra-1',3',5'(10')-trien-17'-yl]-4,4-dihydroxy-2-butenoic acid lactone, M.P. 235–237° C. $[\alpha]_D^{CHCl_3}+93.4°$, 3-[3'-cyclohexyloxy-7'α,8'-epoxy-17'β-hydroxyestra-1',3',5'(10')-trien-17'-yl]-4,4-dihydroxy-2-butenoic acid lactone, 3-[3'-acetoxy-7'α,8'-epoxy-17'β-hydroxyestra-1',3',5'-(10')-trien-17'-yl]-4,4-dihydroxy-2-butenoic acid lactone, 3-[7'α,8-epoxy-17'β-hydroxy-3'-propionyloxyestra-1',3',5'(10')-trien-17'-yl]-4,4-dihydroxy-2-butenoic acid lactone, and 3-[3'-n-butanoyloxy-7'α,8'-epoxy-17'β-hydroxyestra-1',3',5'(10')-trien-17'-yl]-4,4-dihydroxy-2-butenoic acid lactone.

EXAMPLE 7

(A) An 8 N chromic acid solution (6.55 ml.), prepared as described by A. Bowers et al., J. Chem. Soc., p. 2548 (1953), is added slowly to a solution of 4,4-dihydroxy - 3 - [17'β-hydroxy-3'-methoxyestra-1',3',5'(10')-trien-17'-yl]-2-butenoic acid lactone (500 mg.), prepared as described in Example 6, in acetone (25 ml.) at 10–12° C. After the mixture is stirred at room temperature for 15 minutes, the excess oxidant is destroyed by the addition of isopropanol. The solution is evaporated almost to dryness and the residue is extracted with ether and methylene chloride. The organic phase is washed with sodium bicarbonate and water, dried, and evaporated to dryness. The residue is crystallized from chloroform-ether and then acetone-ether to yield the maleic anhydride derivative, 2-[17'β-hydroxy-3'-methoxyestra-1',3',5'(10')-trien-17'-yl]-maleic anhydride, M.P. 227–228° C., $$[\alpha]_D^{CHCl_3} +96.9°$$

In the same manner, the remaining intermediates of Formula VI, described in Example 6, Part A, are oxidized to the corresponding maleic anhydride derivatives of Formula VII when treated with chromic acid solution. In this manner there are obtained the corresponding maleic anhydride derivatives:

2-[3',17'β-dihydroxyestra-1',3',5'(10')-trien-17'-yl]-maleic anhydride,

2-[3'-ethoxy-17'β-hydroxyestra-1',3',5'(10')-trien-17'-yl]-maleic anhydride,

2-[17'β-hydroxy-3'-propoxyestra-1',3',5'(10')-trien-17'-yl]-maleic anhydride,

2-[17'β-hydroxy-3'-isopropoxyestra-1',3',5',(10')-trien-17'-yl]-maleic anhydride, 2-[3'-n-butoxy-17'β-hydroxyestra-1',3',5'(10')-trien-17'-yl]-maleic anhydride, 2-[3'-sec.-butoxy-17'β-hydroxyestra-1',3',5'(10')-trien-17'-yl]-maleic anhydride.

2-[3'-cyclopentyloxy-17'β-hydroxyestra-1',3',5'(10')-trien-17'-yl]-maleic anhydride, M.P. 194–195° C., $[\alpha]_D^{CHCl_3} +89°$, 2-[3'-cyclohexyloxy-17'β-hydroxyestra-1',3',5'(10')-trien-17'-yl]-maleic anhydride, 2-[3'-acetoxy-17'β-hydroxyestra-1',3',5'(10')-trien-17'-yl]-maleic anhydride, M.P. 192–193° C., $[\alpha]_D^{CHCl_3} +81.8°$, 2-[17'β-hydroxy-3'-propionyloxyestra-1',3',5'(10')-trien-17'-yl]-maleic anhydride, 2-[3'-n-butanoyloxy-17'β-hydroxyestra-1',3',5'(10')-trien-17'-yl]-maleic anhydride, 2-[3',17'β-dihydroxyestra-1',3',5'(10'),6',8'-pentaen-17'-yl]-maleic anhydride, 2-[17'β-hydroxy-3'-methoxyestra-1',3',5'(10'),6',8'-pentaen-17'-yl]-maleic anhydride, 2-[3'-ethoxy-17'β-hydroxyestra-1',3',5'(10'),6',8'-pentaen-17'-yl]-maleic anhydride, 2-[17'β-hydroxy-3'-propoxyestra-1',3',5'(10'),6',8'-pentaen-17'-yl]-maleic anhydride, 2-[17'β-hydroxy-3'-isopropoxyestra-1',3',5'(10'),6',8'-pentaen-17'-yl]-maleic anhydride, 2-[3'-n-butoxy-17'β-hydroxyestra-1',3',5'(10'),6',8'-pentaen-17'-yl]-maleic anhydride, 2-[3'-sec.-butoxy-17'β-hydroxyestra-1',3',5'(10'),6',8'-pentaen-17'-yl]-maleic anhydride, 2-[3'-cyclopentyloxy-17'β-hydroxyestra-1',3',5'(10'),6',8'-pentaen-17'-yl]-maleic anhydride, 2-[3'-cyclohexyloxy-17'β-hydroxyestra-1',3',5'(10'),6',8'-pentaen-17'-yl]-maleic anhydride, 2-[3'-acetoxy-17'β-hydroxyestra-1',3',5'(10'),6',8'-pentaen-17'-yl]-maleic anhydride, 2-[17'β-hydroxy-3'-propionyloxyestra-1',3',5'(10'),6',8'-pentaen-17'-yl]-maleic anhydride, and 2-[3'-n-butanoyloxy-17'β-hydroyestra-1',3',5'(10'),6',8'-pentaen-17'-yl]-maleic anhydride.

(B) An 8 N chromic acid solution (54 ml.), prepared as described by A. Bowers et al., J. Chem. Soc., p. 2548, (1953), is added slowly to a solution of 4,4-dihydroxy-3 - [7'α,8' - epoxy - 17'β-hydroxy-3'-methoxyestra-1',3',5' (10')-trien-17'-yl]-2-butenoic acid lactone (41.0 g.), prepared as described in Example 6, in acetone (1640 ml.) at 10–12° C. After the mixture is stirred at room temperature for one hour, the excess oxidant is destroyed by the addition of isopropanol. The solution is evaporated almost to dryness and the residue is mixed with water. The resultant solid is collected, washed with water and dried. Recrystallization of this solid from acetonitrile affords the maleic anhydride derivative, 2-[7'α,8'-epoxy-17'β-hydroxy - 3' - methoxyestra-1',3',5'(10')-trien-17'-yl]-maleic anhydride, M.P. 255–257° C., $[\alpha]_D^{CHCl_3} = +125.6°$.

In the same manner, the remaining intermediates of Formula VI, described in Example 6, Part B, are oxidized to the corresponding maleic anhydride derivatives of Formula VII when treated with chromic acid solution. In this manner there are obtained the corresponding maleic anhydride derivatives.

2-[7'α,8'-epoxy-3',17'β-dihydroxyestra-1',3',5'(10')-trien-17'-yl]-maleic anhydride, 2-[7'α,8'-epoxy-3'-ethoxy-17'β-hydroxyestra-1',3',5'(10')-trien-17'-yl]-maleic anhydride, 2-[7'α,8'-epoxy-17'β-hydroxy-3'-propoxyestra-1',3',5'(10')-trien-17'-yl]-maleic anhydride, 2-[7'α,8'-epoxy-17'β-hydroxy-3'-isopropoxyestra-1',3',5'(10')-trien-17'-yl]-maleic anhydride, 2-[3'-n-butoxy-7'α,8'-epoxy-17'β-hydroxyestra-1',3',5'(10')-trien-17'-yl]-maleic anhydride, 2-[3'-sec.-butoxy-7'α,8'-epoxy-17'β-hydroxyestra-1',3',5'(10')-trien-17'-yl]-maleic anhydride, 2-[3'-cyclopentyloxy-7'α,8'-epoxy-17'β-hydroxyestra-1',3',5'(10')-trien-17'-yl]-maleic anhydride, M.P. 217–219° C., $[\alpha]_D^{CHCl_3} +96.9°$, 2-[3'-cyclohexyloxy-7'α,8'-epoxy-17'β-hydroxyestra-1',3',5'(10')-trien-17'-yl]-maleic anhydride, 2-[3'-acetoxy-7'α,8'-epoxy-17'β-hydroxyestra-1',3',5'(10')-trien-17'-yl]-maleic anhydride, 2-[7'α,8'-epoxy-17'β-hydroxy-3'-propionyloxyestra-1',3',5'(10')-trien-17'-yl]-maleic anhydride, and 2-[3'-n-butanoyloxy-7'α,8'-epoxy-17'β-hydroxyestra-1',3',5'(10')-trien-17'-yl]-maleic anhydride.

EXAMPLE 8

A mixture of 2-[17'β-hydroxy-3'-methoxyestra-1',3',5' (10')-trien-17'-yl]-maleic anhydride (10.0 g.), prepared as described in Example 7, chloroform (200 ml.), acetic acid (500 ml.) and zinc dust (50 g.) is stirred at room temperature for one hour. Excess zinc dust is removed by filtration and the coellcted zinc washed with chloroform. The filtrate and washings are combined and washed well with water, dried over sodium sulfate, filtered and evaporated to dryness. If desired, the residue may be purified by crystallization from chloroform-ether to afford 2-[17'β-hydroxy-3'-methoxyestra-1',3',5'(10')-trien - 17' - yl]-succinic anhydride, M.P. 234–235° C., $[\alpha]_D^{CHCl_3} +69.9°$.

The crude residue is dissolved in a 0.1 N solution of sodium hydroxide. Acidification of this solution with 1 N hydrochloric acid affords a solid, which is collected, washed with water, and dried. Trituration with boiling ether for five minutes affords the steroid lactone of this invention, of Formula II ($R^1$=H and $R^2$=$CH_3$), 17β-hydroxy-3-methoxy-19-norpregna - 1,3,5(10) - triene-20,21-dicarboxylic acid γ-lactone, M.P. 233–234° C. (dec.), $[\alpha]_D^{CHCl_3} +21.3°$.

In the same manner, the remaining maleic anhydride derivatives of Formula VII described in Example 7, are converted firstly to their corresponding succinic anhydride derivatives of Formula VIII on treatment with zinc dust and acetic acid, and subsequently to their corresponding steroid lactones of Formula I (Formulae II, III or IV) by acidification of a solution of the succinic anhydride derivative. In this manner, there are obtained the following steroid lactones:

3,17β-dihydroxy-19-norpregna-1,3,5(10)-triene-20,21-dicarboxylic acid γ-lactone,
3-ethoxy-17β-hydroxy-19-norpregna-1,3,5(10)-triene-20,21-dicarboxylic acid γ-lactone,
3-propoxy-17β-hydroxy-19-norpregna-1,3,5(10)-triene-20,21-dicarboxylic acid γ-lactone,
3-isopropoxy-17β-hydroxy-19-norpregna-1,3,5(10)-triene-20,21-dicarboxylic acid γ-lactone,
3-n-butoxy-17β-hydroxy-19-norpregna-1,3,5(10)-triene-20,21-dicarboxylic acid γ-lactone,
3-sec.-butoxy-17β-hydroxy-19-norpregna-1,3,5(10)-triene-20,21-dicarboxylic acid γ-lactone,
3-cyclopentyloxy-17β-hydroxy-19-norpregna-1,3,5(10)-triene-20,21-dicarboxylic acid γ-lactone, M.P. 185–188° C., $[\alpha]_D^{CHCl_3} = +14.3°$,
3-cyclohexyloxy-17β-hydroxy-19-norpregna-1,3,5(10)-triene-20,21-dicarboxylic acid γ-lactone,
3,17β-dihydroxy-19-norpregna-1,3,5(10),6,8-pentaene-20,21-dicarboxylic acid γ-lactone,
3-methoxy-17β-hydroxy-19-norpregna-1,3,5(10),6,8-pentaene-20,21dicarboxylic acid γ-lactone,
3-ethoxy-17β-hydroxy-19-norpregna-1,3,5(10),6,8-pentaene-20,21-dicarboxylic acid γ-lactone,
3-propoxy-17β-hydroxy-19-norpregna-1,3,5(10),6,8-pentaene-20,21-dicarboxylic acid γ-lactone,
3-isopropoxy-17β-hydroxy-19-norpregna-1,3,5(10),6,8-pentaene-20,21-dicarboxylic acid γ-lactone,
3-n-butoxy-17β-hydroxy-19-norpregna-1,3,5(10),6,8-pentaene-20,21-dicarboxylic acid γ-lactone,
3-sec.-butoxy-17β-hydroxy-19-norpregna-1,3,5(10),6,8-pentaene-20,21-dicarboxylic acid γ-lactone,
3-cyclopentyloxy-17β-hydroxy-19-norpregna-1,3,5(10),6,8-pentaene-20,21-dicarboxylic acid γ-lactone,
3-cyclohexyloxy-17β-hydroxy-19-norpregna-1,3,5(10),6,8-pentaene-20,21-dicarboxylic acid γ-lactone,
7α,8-epoxy-3,17β-dihydroxy-19-norpregna-1,3,5(10),triene-20,21-dicarboxylic acid γ-lactone,
3-methoxy-7α,8-epoxy-17β-hydroxy-19-norpregna-1,3,5(10)-triene-20,21-dicarboxylic acid γ-lactone, M.P. 135–137°, $[\alpha]_D^{CHCl_3} = +60.2°$,
3-ethoxy-7α,8-epoxy-17β-hydroxy-19-norpregna-1,3,5(10)-triene-20,21-dicarboxylic acid γ-lactone,
3-propoxy-7α,8-epoxy-17β-hydroxy-19-norpregna-1,3,5(10)-triene-20,21-dicarboxylic acid γ-lactone,
3-isopropoxy-7α,8-epoxy-17β-hydroxy-19-norpregna-1,3,5(10)-triene-20,21-dicarboxylic acid γ-lactone,
3-n-butoxy-7α,8-epoxy-17β-hydroxy-19-norpregna-1,3,5(10)-triene-20,21-dicarboxylic acid γ-lactone,
3-sec.-butoxy-7α,8-epoxy-17β-hydroxy-19-norpregna-1,3,5(10)-triene-20,21-dicarboxylic acid γ-lactone,
3-cyclopentyloxy-7α,8-epoxy-17β-hydroxy-19-norpregna-1,3,5(10)-triene-20,21-dicarboxylic acid γ-lactone, and
3-cyclohexyloxy-7α,8-epoxy-17β-hydroxy-19-norpregna-1,3,5(10)-triene-20,21-dicarboxylic acid γ-lactone.

EXAMPLE 9

A solution of 3,17β-dihydroxy-19-norpregna-1,3,5(10)-triene-20,21-dicarboxylic acid γ-lactone (14.5 g.), prepared as described in Example 8, pyridine (145 ml.) and acetic anhydride (145 ml.) is left at room temperature for 30 minutes and then poured into ice water. The solution is rendered acidic by the addition of 10% sulfuric acid solution. The resultant solid precipitate is collected, washed with water and dried. The precipitated solid is triturated with boiling ether and then crystallized from acetone-hexane to yield the steroid lactone of this invention, 3 - acetoxy-17β-hydroxy-19-norpregna-1,3,5(10)-triene-20,21-dicarboxylic acid γ-lactone (II, R¹=H and R²=CH₃CO), M.P. 230–232° C. (dec.), $$[\alpha]_D^{CHCl_3} = +13.7°$$

In the same manner, but using an equivalent amount of propionic or n-butyric anhydride instead of acetic anhydride, the steroid lactones of this invention, 3-propionyloxy-17β-hydroxy-19-norpregna - 1,3,5(10 - triene-20,21-dicarboxylic acid γ-lactone and 3-n-butanoyloxy-17β-hydroxy-19-norpregna-1,3,5(10)-triene - 20,21 - dicarboxylic acid γ-lactone, are obtained respectively.

In the same manner but using 3,17β-dihydroxy-19-norpregna-1,3,5(10),6,8-pentaene-20,21-dicarboxylic acid γ-lactone or 7α,8-epoxy-3,17β-dihydroxy-19-norpregna-1,3,5(10)-triene-20,21-dicarboxylic acid γ-lactone, prepared as described in Example 8, instead of 3,17β-dihydroxy-19-norpregna-1,3,5(10)-triene - 20,21 - dicarboxylic acid γ-lactone, the following corresponding acylated steroid lactones of this invention are obtained:

3-acetoxy-17β-hydroxy-19-norpregna-1,3,5(10),6,8-pentaene-20,21-dicarboxylic acid γ-lactone,
17β-hydroxy-3-propionyloxy-19-norpregna-1,3,5(10),6,8-pentaene-20,21-dicarboxylic acid γ-lactone,
3-n-butanoyloxy-17β-hydroxy-19-norpregna-1,3,5(10),6,8-pentaene-20,21-dicarboxylic acid γ-lactone,
3-acetoxy-7α,8-epoxy-17β-hydroxy-19-norpregna-1,3,5(10)-triene-20,21-dicarboxylic acid γ-lactone,
7α,8-epoxy-17β-hydroxy-3-propionyloxy-19-norpregna-1,3,5(10)-triene-20,21-dicarboxylic acid γ-lactone, and
3-n-butanoyloxy-7α,8-epoxy-17β-hydroxy-19-norpregna-1,3,5(10)-triene-20,21-dicarboxylic acid γ-lactone.

EXAMPLE 10

A solution of diazomethane (3 ml.), prepared by the addition of 40% potassium hydroxide (6 ml.) to N-nitrosomethylurea (2 g.) in ether (20 ml.) is added to a solution of 17β - hydroxy-3-methoxy-19-norpregna-1,3,5(10)-triene-20,21-dicarboxylic acid γ-lactone (300 mg.), prepared as described in Example 8, in ether (6 ml.). The mixture is stirred for 15 minutes. Excess diazomethane is destroyed by the addition of acetic acid. The reaction mixture is evaporated to dryness. The residue is crystallized from methanol to yield 17β-hydroxy-3-methoxy-19-norpregna-1,3,5(10)-triene - 20,21 - dicarboxylic acid γ-lactone methyl ester (II, R¹=CH₃ and R²=CH₃), M.P. 135–136° C., $[\alpha]_D^{CHCl_3} = +10.5°$.

In the same manner, the remaining steroid lactones, described in Examples 8 and 9, are treated with diazomethane to yield their corresponding methyl esters. In this manner, there are obtained the steroid lactones of this invention:

3,17β-dihydroxy-19-norpregna-1,3,5(10)-triene-20,21-dicarboxylic acid γ-lactone methyl ester,
3-ethoxy-17β-hydroxy-19-norpregna-1,3,5(10)-triene-20,21-dicarboxylic acid γ-lactone methyl ester,
3-propoxy-17β-hydroxy-19-norpregna-1,3,5(10)-triene-20,21-dicarboxylic acid γ-lactone methyl ester,
3-isopropoxy-17β-19-norpregna-1,3,5(10)-triene-20,21-dicarboxylic acid γ-lactone methyl ester,
3-n-butoxy-17β-hydroxy-19-norpregna-1,3,5(10)-triene-20,21-dicarboxylic acid γ-lactone methyl ester,
3-sec.-butoxy-17β-hydroxy-19-norpregna-1,3,5(10)-triene-20,21-dicarboxylic acid γ-lactone methyl ester,
3-cyclopentyloxy - 17β - hydroxy-19-norpregna-1,3,5(10)-triene-20,21-dicarboxylic acid γ-lactone methyl ester, M.P. 163–164° C., $[\alpha]_D^{CHCl_3} + 3.7°$.
3-cyclohexyloxy-17β-hydroxy-19-norpregna-1,3,5(10)-triene-20,21-dicarboxylic acid γ-lactone methyl ester,
3,17β-dihydroxy-19-norpregna-1,3,5(10),6,8-pentaene-20,21-dicarboxylic acid γ-lactone methyl ester,
3-methoxy-17β-hydroxy-19-norpregna-1,3,5(10),6,8-pentaene-20,21-dicarboxylic acid γ-lactone methyl ester, 3-ethoxy-17β-hydroxy-19-norpregna-1,3,5(10),6,8-pentaene-20,21-dicarboxylic acid γ-lactone methyl ester,
3-propoxy-17β-hydroxy-19-norpregna-1,3,5(10),6,8-pentaene-20,21-dicarboxylic acid γ-lactone methyl ester,
3-isopropoxy-17β-hydroxy-19-norpregna-1,3,5(10),6,8-pentaene-20,21-dicarboxylic acid γ-lactone methyl ester,
3-n-butoxy-17β-hydroxy-19-norpregna-1,3,5(10),6,8-pentaene-20,21-dicarboxylic acid γ-lactone methyl ester,
3-sec.-butoxy-17β-hydroxy-19-norpregna-1,3,5(10),6,8-pentaene-20,21-dicarboxylic acid γ-lactone methyl ester,
3-cyclopentyloxy-17β-hydroxy-19-norpregna-1,3,5(10),6,8-pentaene-20,21-dicarboxylic acid γ-lactone methyl ester,
3-cyclohexyloxy-17β-hpdroxy-19-norpregna-1,3,5(10),6,8-pentaene-20,21-dicarboxylic acid γ-lactone methyl ester,
3,17β-dihydroxy-7α,8-epoxy-19-norpregna-1,3,5(10)-triene-20,21-dicarboxylic acid γ-lactone methyl ester,
3-methoxy-17β-hydroxy-7α,8-epoxy-norpregna-1,3,5(10)-triene-20,21-dicarboxylic acid γ-lactone methyl ester, M.P. 212–213° C., $[\alpha]_D^{CHCl_3} = +69.5°$,
3-ethoxy-17β-hydroxy-7α,8-epoxy-19-norpregna-1,3,5-(10)-triene-20,21-dicarboxylic acid γ-lactone methyl ester,
3-propoxy-17β-hydroxy-7α,8-epoxy-19-norpregna-1,3,5-(10)-triene-20,21-dicarboxylic acid γ-lactone methyl ester,
3-isopropoxy-17β-hydroxy-7α,8-epoxy-19-norpregna-1,3,5(10)-triene-20,21-dicarboxylic acid γ-lactone methyl ester,
3-n-butoxy-17β-hydroxy-7α,8-epoxy-19-norpregna-1,3,5(10)-triene-20,21-dicarboxylic acid γ-lactone methyl ester,
3-sec.-butoxy-17β-hydroxy-7α,8-epoxy-19-norpregna-1,3,5(10)-triene-20,21-dicarboxylic acid γ-lactone methyl ester,
3-cyclopentyloxy-17β-hydroxy-7α,8-epoxy-19-norpregna-1,3,5(10)-triene-20,21-dicarboxylic acid γ-lactone methyl ester,
3-cyclohexyloxy-17β-hydroxy-7α,8-epoxy-19-norpregna-1,3,5(10)-triene-20,21-dicarboxylic acid γ-lactone methyl ester,
3-acetoxy-17β-hydroxy-19-norpregna-1,3,5(10)-triene-20,21-dicarboxylic acid γ-lactone methyl ester, M.P. 199–201° C., $[\alpha]_D^{CHCl_3} = +3.8°$,
3-propionyloxy-17β-hydroxy-19-norpregna-1,3,5(10)-triene-20,21-dicarboxylic acid γ-lactone methyl ester,
3-n-butanoyloxy-17β-hydroxy-19-norpregna-1,3,5(10)-triene-20,21-dicarboxylic acid γ-lactone methyl ester,
3-acetoxy-17β-hydroxy-19-norpregna-1,3,5(10),6,8-pentaene-20,21-dicarboxylic acid γ-lactone methyl ester,
3-propionyloxy-17β-hydroxy-19-norpregna-1,3,5(10),6,8-pentaene-20,21-dicarboxylic acid γ-lactone methyl ester,
3-n-butanoyloxy-17β-hydroxy-19-norpregna-1,3,5(10),6,8-pentaene-20,21-dicarboxylic acid γ-lactone methyl ester,
3-acetoxy-7α,8-epoxy-17β-hydroxy-19-norpregna-1,3,5(10)-triene-20,21-dicarboxylic acid γ-lactone methyl ester,
3-propionyloxy-7α,8-epoxy-17β-hydroxy-19-norpregna-1,3,5(10)-triene-20,21-dicarboxylic acid γ-lactone methyl ester, and
3-n-butanoyloxy-7α,8-epoxy-17β-hydroxy-19-norpregna-1,3,5(10)-triene-20,21-dicarboxylic acid γ-lactone methyl ester In the same manner, the corresponding ethyl esters, instead of the corresponding methyl esters, are obtained when the steroid lactones described in Examples 8 and 9 are treated with diazoethane, described by A. F. McKay et al., Can. J. Research, vol. 28B, p. 683 (1950), instead of diazomethane.

I claim:
1. A compound selected from those of the formula

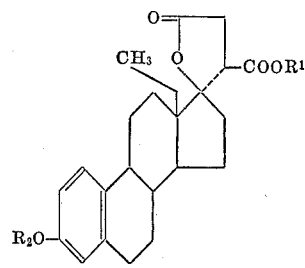

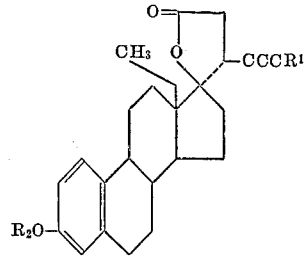

and

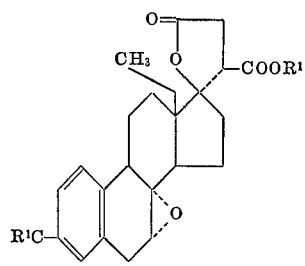

wherein $R^1$ is selected from the group which consists of hydrogen, methyl and ethyl; and $R^2$ is selected from the group which consists of hydrogen, alkyl containing from one to four carbon atoms, cycloalkyl containing from five to six carbon atoms and acyl containing from two to four carbon atoms.

2. A compound selected from those of the formula

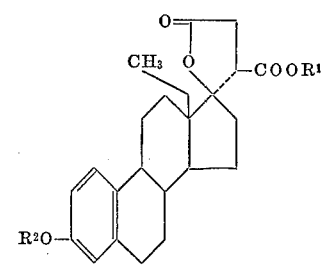

wherein $R^1$ is selected from the group consisting of hydrogen, methyl and ethyl; and $R^2$ is selected from the group consisting of hydrogen, alkyl containing from one to four carbon atoms, cycloalkyl containing from five to six carbon atoms and acyl containing from two to four carbon atoms.

3. A compound selected from those of the formula

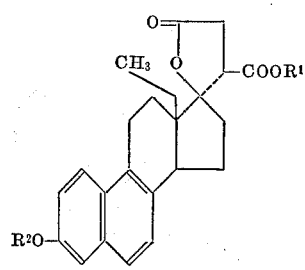

wherein $R^1$ is selected from the group consisting of hydrogen, methyl and ethyl; and $R^2$ is selected from the group consisting of hydrogen, alkyl containing from one to four carbon atoms, cycloalkyl containing from five to six carbon atoms and acyl containing from two to four carbon atoms.

4. A compound selected from those of the formula

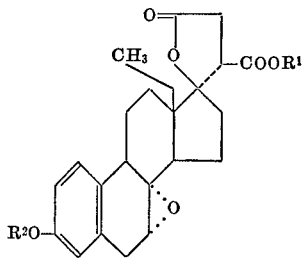

wherein R¹ is selected from the group consisting of hydrogen, methyl and ethyl; and R² is selected from the group consisting of hydrogen, alkyl containing from one to four carbon atoms, cycloalkyl containing from five to six carbon atoms and acyl containing from two to four carbon atoms.

5. 17β - hydroxy - 3 - methoxy - 19 - norpregna - 1,3,5 (10)-triene-20,21-dicarboxylic acid γ-lactone, as claimed in claim 1.

6. 3 - cyclopentyloxy - 17β - hydroxy - 19 - norpregna-1,3,5(10)-triene - 20,21 - dicarboxylic acid γ-lactone, as claimed in claim 1.

7. 3 - methoxy - 7α,8 - epoxy - 17β - hydroxy - 19-norpregna-1,3,5(10)-triene - 20,21 - dicarboxylic acid γ-lactone, as claimed in claim 1.

8. 3 - acetoxy - 17β - hydroxy - 19 - norpregna - 1,3,5 (10)-triene - 20,21 - dicarboxylic acid γ-lactone, as claimed in claim 1.

9. 17β - hydroxy - 3 - methoxy - 19 - norpregna - 1,3,5 (10) - triene - 20,21 - dicarboxylic acid γ-lactone methyl ester, as claimed in claim 1.

10. 3 - cyclopentyloxy - 17β - hydroxy - 19 - norpregna-1,3,5(10) - triene - 20,21 - dicarboxylic acid γ-lactone methyl ester, as claimed in claim 1.

11. 3 - methoxy - 17β - hydroxy - 7α,8 - epoxy-19-norpregna - 1,3,5(10) - triene - 20,21 - dicarboxylic acid γ-lactone methyl ester, as claimed in claim 1.

12. 3 - acetoxy - 17β - hydroxy - 19 - norpregna-1,3,5 (10) - triene - 20,21 - dicarboxylic acid γ-lactone methyl ester, as claimed in claim 1.

13. 3 - [3' - cyclopentyloxy - 17'β - hydroxyestra-1',3', 5'(10')-trien-17'-yl] - 4,4 - dihydroxy - 2 - butenoic acid lactone.

14. A compound selected from those of the formula

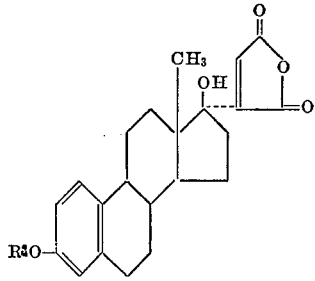

and

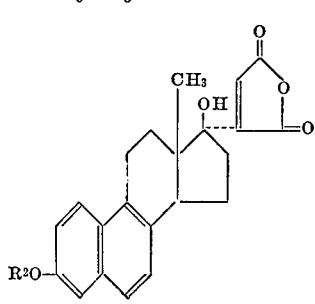

and

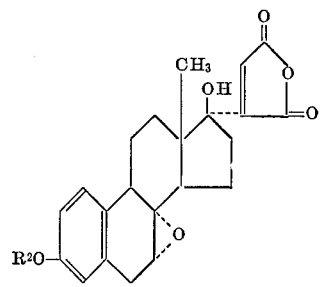

wherein R² is selected from the group which consists of hydrogen, alkyl containing from one to four carbon atoms, cycloalkyl containing from five to six carbon atoms and acyl containing from two to four carbon atoms.

15. 2 - [17'β - hydroxy - 3' - methoxyestra - 1,3',5' (10')-trien-17'-yl]-maleic anhydride.

16. 2 - [3' - cyclopentyloxy - 17'β -hydroxyestra-1',3', 5'(10')-trien-17'-yl]-maleic anhydride.

17. 2 - [3' - acetoxy - 17'β -hydroxyestra - 1',3',5'(10')-trien-17'-yl]-maleic anhydride.

18. 2-[7'α,8'-epoxy - 17'β - hydroxy-3'-methoxyestra-1',3',5'(10')-trien-17'-yl]-maleic anhydride.

19. 2-[3'-cyclopentyloxy - 7'α,8' - epoxy-17'β-hydroxyestra-1',3',5'(10')-trien-17'-yl]-maleic anhydride.

20. A compound selected from those of the formula

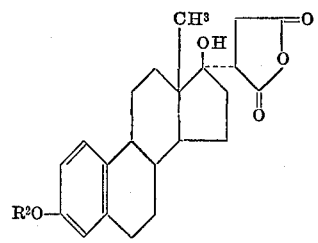

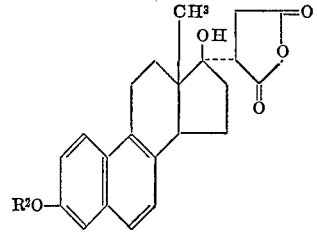

and

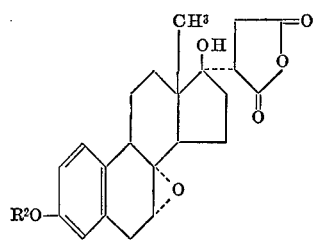

wherein R² is selected from the group which consists of hydrogen, alkyl containing from one to four carbon atoms, cycloalkyl containing from five to six carbon atoms and acyl containing from two to four carbon atoms.

21. 2-[17'β-hydroxy - 3' - methoxyestra-1',3',5'(10')-trien-17'-yl]-succinic anhydride.

22. The process which comprises subjecting a compound selected from those of the formula

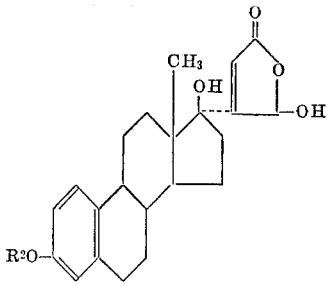

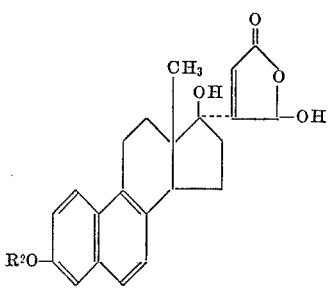

and

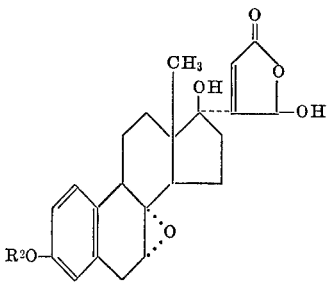

wherein $R^2$ is selected from the group which consists of hydrogen, alkyl containing from one to four carbon atoms, cycloalkyl containing from five to six carbon atoms and acyl containing from two to four carbon atoms, to oxidation by means of hexavalent chromium ion, thereby securing the corresponding compound selected from those of the formula

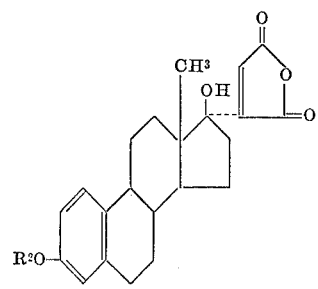

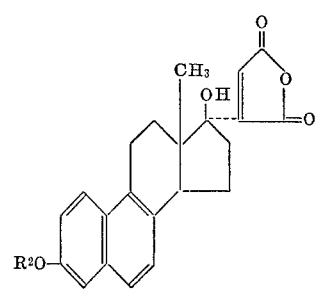

and

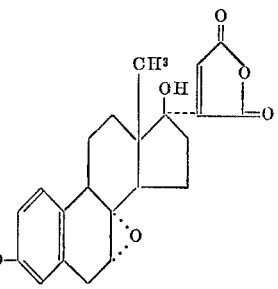

$R^2$ being as above defined; reducing said last-named compound in the presence of zinc and acetic acid, thereby securing the corresponding compound selected from those of the formula

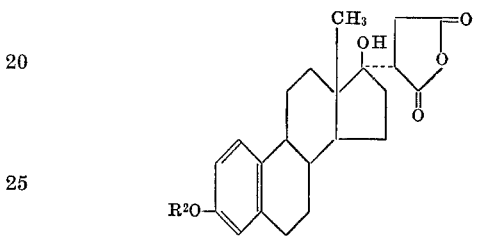

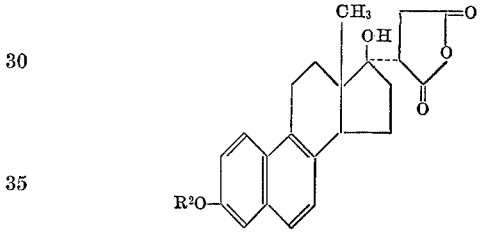

and

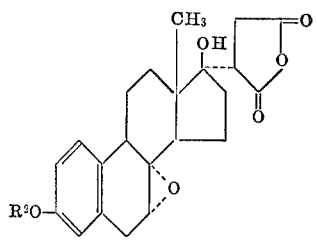

$R^2$ being as above defined; and dissolving said last-named compound in an aqueous solution of an alkali metal hydroxide, followed by subsequent acidification of said resulting solution, thereby securing the corresponding compound selected from those of the formula

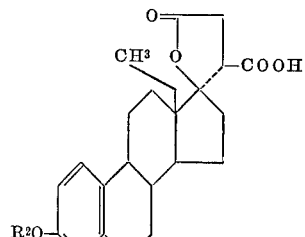

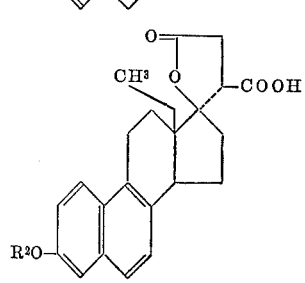

and
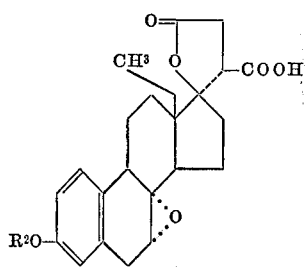
$R^2$ being as above defined.
References Cited
UNITED STATES PATENTS
3,483,192   12/1969   Brown _____ 260—239.57
ELBERT L. ROBERTS, Primary Examiner
U.S. Cl. X.R.
260—239.57

UNITED STATES PATENT OFFICE
CERTIFICATE OF CORRECTION

Patent No. 3,595,856                         Dated July 27, 1971

Inventor(s) Yvon Lefebvre

It is certified that error appears in the above-identified patent and that said Letters Patent are hereby corrected as shown below:

Column 2, formulae II, III and IV should read --

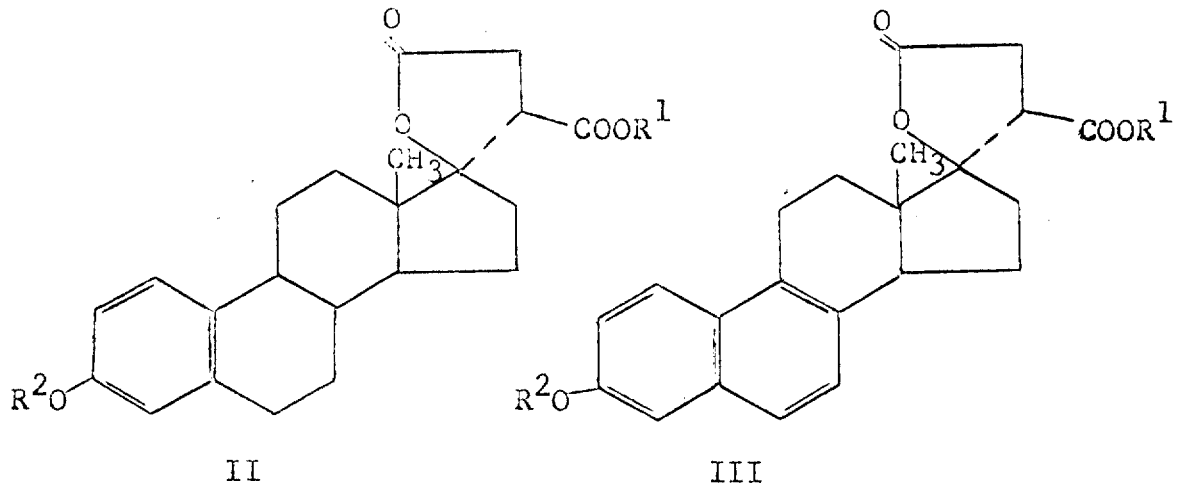

II                    III

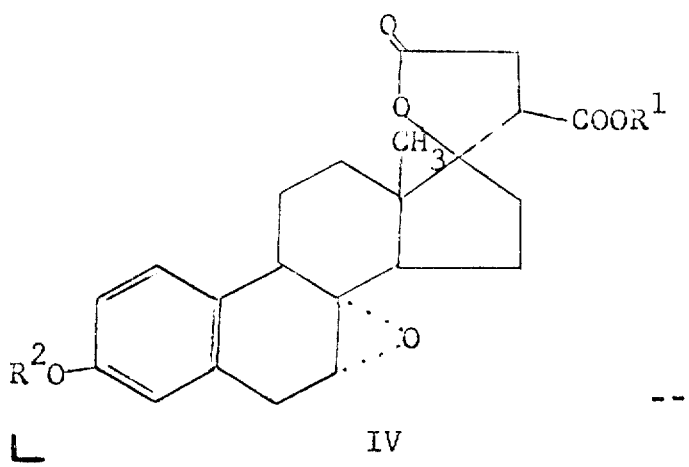

IV

--

PO-1050
(5/69)

UNITED STATES PATENT OFFICE
CERTIFICATE OF CORRECTION

Patent No. 3,595,856  Dated July 27, 1971

Inventor(s) Yvon Lefebvre

It is certified that error appears in the above-identified patent and that said Letters Patent are hereby corrected as shown below:

Column 14, all formulae in claim 1 should read --

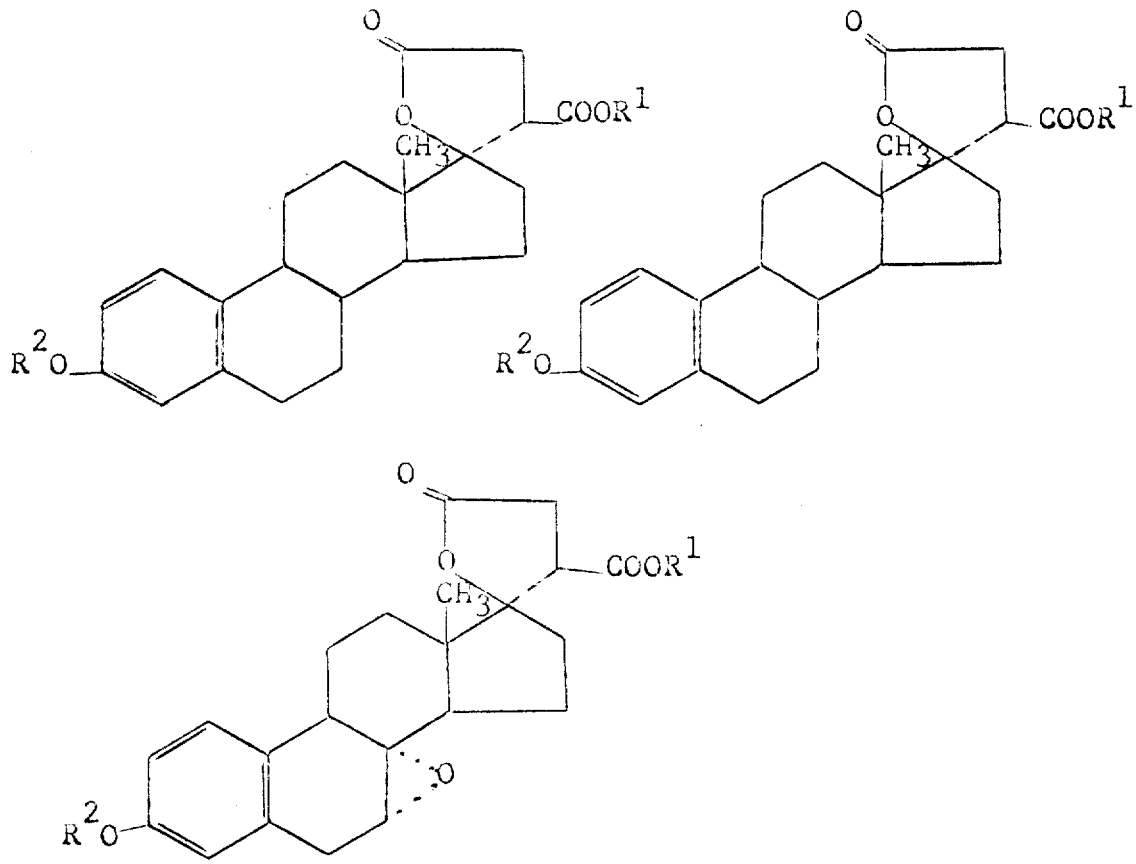

- 2 -

UNITED STATES PATENT OFFICE
CERTIFICATE OF CORRECTION

Patent No. 3,595,856  Dated July 27, 1971

Inventor(s) Yvon Lefebvre

It is certified that error appears in the above-identified patent and that said Letters Patent are hereby corrected as shown below:

Column 14, formula in claim 2 should read --

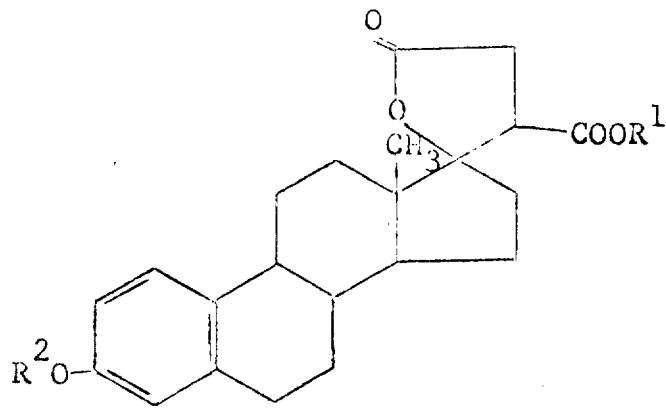

Column 14, formula in claim 3 should read --

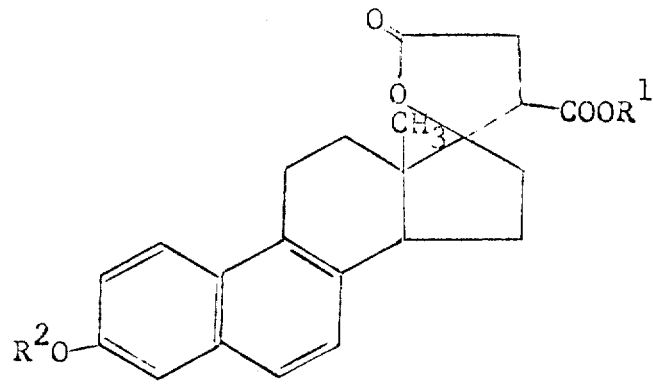

UNITED STATES PATENT OFFICE
CERTIFICATE OF CORRECTION

Patent No. 3,595,856     Dated July 27, 1971

Inventor(s) Yvon Lefebvre

It is certified that error appears in the above-identified patent and that said Letters Patent are hereby corrected as shown below:

Column 15, formula in claim 4 should read --

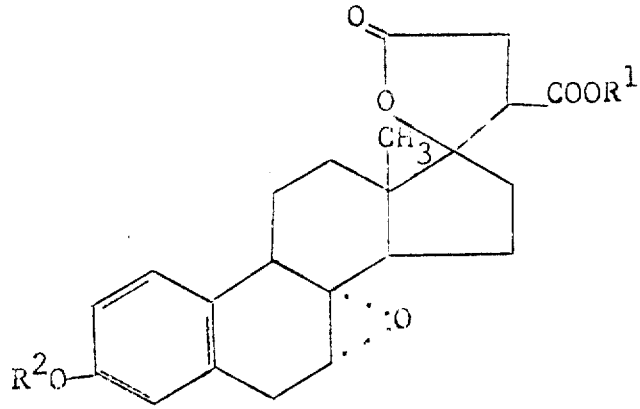

Column 18, two formulae between lines 55 and 75 in claim 22 should read --

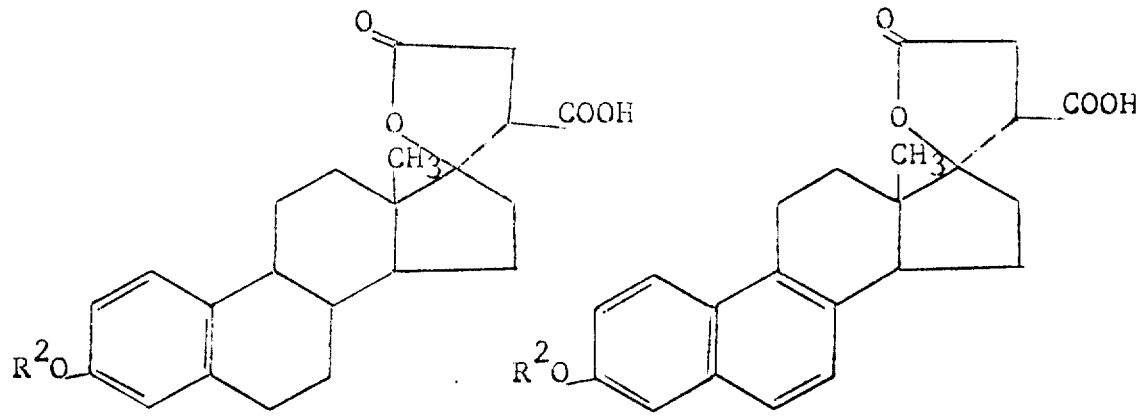

- 4 -

UNITED STATES PATENT OFFICE
CERTIFICATE OF CORRECTION

Patent No. 3,595,856                    Dated  July 27, 1971

Inventor(s) Yvon Lefebvre

It is certified that error appears in the above-identified patent and that said Letters Patent are hereby corrected as shown below:

Column 19, formula should read --

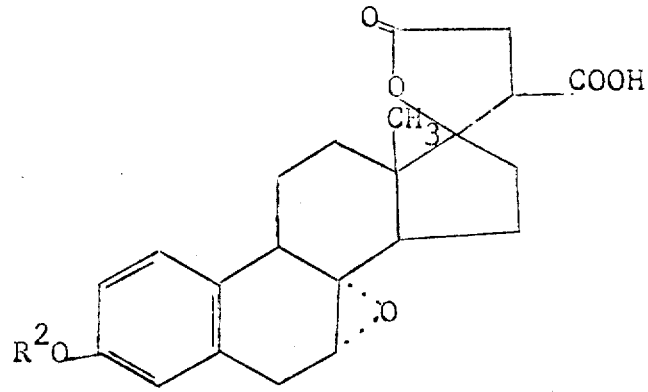

Signed and sealed this 28th day of March 1972.

(SEAL)
Attest:

EDWARD M. FLETCHER, JR.                ROBERT GOTTSCHALK
Attesting Officer                      Commissioner of Patents